United States Patent
Kamijima et al.

(10) Patent No.: US 10,451,959 B2
(45) Date of Patent: Oct. 22, 2019

(54) LIGHT SOURCE DEVICE AND PROJECTOR

(71) Applicant: SEIKO EPSON CORPORATION, Tokyo (JP)

(72) Inventors: Shunji Kamijima, Suwa-gun (JP); Wataru Yasumatsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/048,714

(22) Filed: Jul. 30, 2018

(65) Prior Publication Data
US 2019/0041739 A1 Feb. 7, 2019

(30) Foreign Application Priority Data
Aug. 4, 2017 (JP) ................. 2017-151346

(51) Int. Cl.
*G03B 21/20* (2006.01)
*G02B 27/48* (2006.01)
*G03B 33/12* (2006.01)

(52) U.S. Cl.
CPC ......... *G03B 21/2073* (2013.01); *G02B 27/48* (2013.01); *G03B 21/204* (2013.01); *G03B 21/208* (2013.01); *G03B 21/2093* (2013.01); *G03B 33/12* (2013.01)

(58) Field of Classification Search
CPC ............. G03B 21/204; G03B 21/208; G03B 21/2073; G03B 21/2093; G03B 33/12; G02B 26/008; G02B 5/02–0294; G02B 27/48; F21K 9/64; F21V 9/30; F21V 9/32; G02F 2001/133614
See application file for complete search history.

(56) References Cited

U.S. PATENT DOCUMENTS

| 2013/0242534 A1* | 9/2013 | Pettitt | G03B 21/204 362/84 |
| 2014/0268063 A1* | 9/2014 | Akiyama | G03B 21/204 353/20 |

(Continued)

FOREIGN PATENT DOCUMENTS

JP 2013-250494 A 12/2013

*Primary Examiner* — Cara E Rakowski
*Assistant Examiner* — Christopher A Lamb, II
(74) *Attorney, Agent, or Firm* — Oliff PLC

(57) ABSTRACT

A light source device includes a light emitting element adapted to emit light having a first polarization direction and a first wavelength, a polarization separation element adapted to transmit either one of the light having the first polarization direction and the first wavelength and light having a second polarization direction and the first wavelength, and reflect the other, and transmit or reflect light having a second wavelength to emit the light having the second wavelength toward a same direction as a direction in which the light having the second polarization direction and the first wavelength is emitted, a wavelength conversion element adapted to convert the light having the first wavelength into the light having the second wavelength, and a diffusion optical system disposed on a light path between the polarization separation element and the wavelength conversion element. The diffusion optical system includes a diffusion section and a light separation section.

14 Claims, 10 Drawing Sheets

(56) References Cited

U.S. PATENT DOCUMENTS

2014/0375959 A1* 12/2014 Yang .................... G03B 21/204
 353/31
2015/0003042 A1* 1/2015 Strau ........................ F21V 7/05
 362/84

* cited by examiner

LIGHT SOURCE DEVICE AND PROJECTOR

BACKGROUND

1. Technical Field

The present invention relates to a light source device and a projector.

2. Related Art

As a light source device used in a projector, there is proposed a light source device using fluorescence emitted from a phosphor when irradiating the phosphor with excitation light emitted from a light emitting element such as a semiconductor laser.

In, for example, JP-A-2013-250494 (Document 1), there is disclosed a light source device provided with a light source, a light separation element, a phosphor, a first reflecting element, a quarter-wave plate, a diffusion plate, and a second reflecting element, wherein the light source emits excitation light, the light separation element reflects S-polarized light and transmits P-polarized light, the phosphor is irradiated with one of the light beams separated into by the light separation element, the first reflecting element reflects fluorescence emitted from the phosphor, the quarter-wave plate adjusts the polarization state of the other of the light beams separated into by the light separation element, the diffusion plate diffuses the other one of the light beams, and the second reflecting element reflects the other of the light beams having been transmitted through the quarter-wave plate to guide the light beam thus reflected to the light separation element via the quarter-wave plate.

According to the light source device of Document 1, blue light diffused by the diffusion plate and yellow fluorescence emitted from the phosphor are combined with each other, and thus, it is possible to obtain white light. However, in this light source device, since there is adopted a configuration in which an optical system for guiding the light to the phosphor and an optical system for guiding the light to the diffusion plate are separately disposed, and these optical systems are perpendicular to each other, there is a problem that the light source device grows in size.

SUMMARY

An advantage of some aspects of the invention is to provide a light source device small in size and capable of obtaining light having a necessary diffusion angle. Another advantage of some aspects of the invention is to provide a projector equipped with the light source device described above.

A light source device according to an aspect of the invention includes a light emitting element adapted to emit light having a first polarization direction and a first wavelength, a polarization separation element adapted to transmit either one of the light having the first polarization direction and the first wavelength and light having a second polarization direction perpendicular to the first polarization direction and the first wavelength, and reflect the other, and transmit or reflect light having a second wavelength different from the first wavelength to emit the light having the second wavelength toward a same direction as a direction in which the light having the second polarization direction and the first wavelength is emitted, a wavelength conversion element adapted to convert the light having the first wavelength into the light having the second wavelength, and a diffusion optical system disposed on a light path between the polarization separation element and the wavelength conversion element. The diffusion optical system includes a diffusion section adapted to diffuse the light having the first wavelength when the light having the first wavelength passes, and a light separation section adapted to reflect a part of the light having the first wavelength toward the diffusion section, transmit another part of the light having the first wavelength, and transmit the light having the second wavelength.

In the diffusion optical system of the light source device according to the aspect of the invention, the light having the first wavelength propagated from the polarization separation element toward the wavelength conversion element is diffused when first passing through the diffusion section, and a part of the light thus diffused is reflected by the light separation section, and is then diffused once again when passing through the diffusion section in the opposite direction to the direction in which the light has first passed through the diffusion section. Therefore, the part of the light having the first wavelength is diffused each of the two times the part passes through the diffusion section. Therefore, in the light source device according to the aspect of the invention, the diffusion angle distribution of the light broadens compared to the case in which the light having the first wavelength passes through the diffusion section just one time. In contrast, another part of the light having the first wavelength is transmitted through the light separation section, and enters the wavelength conversion element, and is converted into the light having the second wavelength. The light having the second wavelength having been emitted from the wavelength conversion element is emitted toward the same direction as the light having the first wavelength from the polarization separation element. As described above, according to the light source device of the aspect of the invention, there is no need to separately dispose the optical system for guiding the light to the diffusion section and the optical system for guiding the light to the wavelength conversion element, it is possible to emit the light having a necessary diffusion angle distribution, and it is possible to provide the light source device small in size.

In the light source device according to the aspect of the invention, the light separation section may be formed of a dichroic mirror adapted to reflect a part of the light having the first wavelength toward the diffusion section, transmit another part of the light having the first wavelength toward the wavelength conversion element, and transmit the light having the second wavelength.

According to this configuration, it is possible to manufacture the light separation section by forming the dichroic mirror on one surface of an arbitrary member.

In the light source device according to the aspect of the invention, the diffusion optical system may include an optical element including a plate body having a first surface located on a side of the polarization separation element and a second surface located on a side of the wavelength conversion element, the diffusion section may be disposed on the first surface of the optical element, and the dichroic mirror may be disposed on the second surface of the optical element.

According to this configuration, since one optical element includes both of the diffusion section and the light separation section, the number of the components can be reduced, and thus, the miniaturization of the light source device can be achieved.

In the light source device according to the aspect of the invention, the optical element may be formed of a wave plate.

In order to emit a part of the light, which has the first wavelength and is reflected by the diffusion section, and propagates toward the polarization separation element, from the polarization separation element toward a direction different from the side of the light emitting element, it is necessary to convert the polarization direction of the part of the light having the first wavelength from the first polarization direction to the second polarization direction, and the wave plate is necessary. According to the configuration described above, since the optical element also functions as the wave plate in addition to the fact that the optical element includes both of the diffusion section and the light separation section, the number of the components can further be reduced, and further miniaturization of the light source device can be achieved.

In the light source device according to the aspect of the invention, the diffusion optical system may include a light collection optical system including at least one light collection optical element, and adapted to converge the light having the first wavelength toward the wavelength conversion element, and the diffusion section may be disposed on a light path of the light having the first wavelength converged by the light collection optical system.

According to this configuration, it is possible to suppress vignetting of the light having the first wavelength in the light collection optical system due to broadening of the diffusion angle distribution in the diffusion section. As a result, the utilization efficiency of the light having the first wavelength can be improved.

In the light source device according to the aspect of the invention, the diffusion section may be disposed at a position where an intermediate image of the light emitting element is formed.

According to this configuration, the vignetting in the light collection optical system described above can be suppressed, and at the same time, the diffusion efficiency of the light having the first wavelength is improved, and it is possible to further homogenize the illuminance of the light emitted from the polarization separation element. It should be noted that in the case in which substantially the same advantages are exerted, the position where the diffusion section is disposed can also be the vicinity of the position where the intermediate image is formed.

In the light source device according to the aspect of the invention, the light collection optical system may include a first light collection optical element disposed on a side of the polarization separation element, and a second light collection optical element disposed on a side of the wavelength conversion element, the diffusion section may be provided in the first light collection optical element, and the light separation section may be provided in the second light collection optical element.

According to this configuration, since the two light collection optical elements provided in the light collection optical system respectively function as the diffusion section and the light separation section, it is possible to achieve further reduction of the number of components, and further miniaturization of the light source device.

In the light source device according to the aspect of the invention, the light collection optical system may include a first light collection optical element disposed on a side of the polarization separation element, and a second light collection optical element formed of a plano-convex lens disposed on a side of the wavelength conversion element, the diffusion section may be provided on a convex surface of the second light collection optical element, and the light separation section may be disposed on a flat surface of the second light collection optical element.

According to this configuration, since the diffusion section is provided on the convex surface of the second light collection optical element, the incident angle of the light having the first wavelength with respect to the diffusion section becomes smaller compared to the case in which the diffusion section is provided on the flat surface. Therefore, it is possible to obtain the light having the first wavelength having a moderate diffusion angle distribution, and it is possible to approximate the diffusion angle distribution of the light having the first wavelength to the diffusion angle distribution of the light having the second wavelength.

In the light source device according to the aspect of the invention, the diffusion section may be disposed in an area crossing an optical axis of the light having the first wavelength.

According to this configuration, there is no chance that the light having the first wavelength is uselessly significantly diffused by the diffusion section, and it is possible to suppress the vignetting of the light emitted from the diffusion section in the light collection optical system.

In the light source device according to the aspect of the invention, the diffusion optical system may include a rotary wheel including a plate body having a first surface located on a side of the polarization separation element and a second surface located on a side of the wavelength conversion element, and a drive source adapted to rotate the rotary wheel, at least one first area and at least one second area may be disposed in the rotary wheel so as to be arranged in a rotational direction of the rotary wheel, in the first area, the diffusion section may be disposed on the first surface, and a mirror adapted to reflect at least a part of the light having the first wavelength toward the diffusion section may be disposed on the second surface, and the second area may transmit the light having the first wavelength and the light having the second wavelength.

According to this configuration, even if the mirror disposed in the first area of the rotary wheel reflects all of the light having the first wavelength, the second area transmits the light having the first wavelength together with the light having the second wavelength. Therefore, it is possible to temporally achieve the function of the light separation section for reflecting a part of the light having the first wavelength toward the diffusion section, transmitting another part of the light having the first wavelength, and transmitting the light having the second wavelength. Thus, it is possible to provide the light source device small in size and capable of emitting the light having the necessary diffusion angle distribution.

A projector according to another aspect of the invention includes the light source device according to the aspect of the invention, a light modulation device adapted to modulate light from the light source device in accordance with image information to thereby form image light, and a projection optical system adapted to project the image light.

According to this configuration, it is possible to realize the projector small in size, high in efficiency, and capable of projecting an image with color shading and speckles suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described using FIG. 1 through FIG. 5.

It should be noted that in each of the following drawings, the constituents are shown with the scale ratios of respective sizes set differently between the constituents in some cases in order to facilitate the visualization of each of the constituents.

Figure 1:
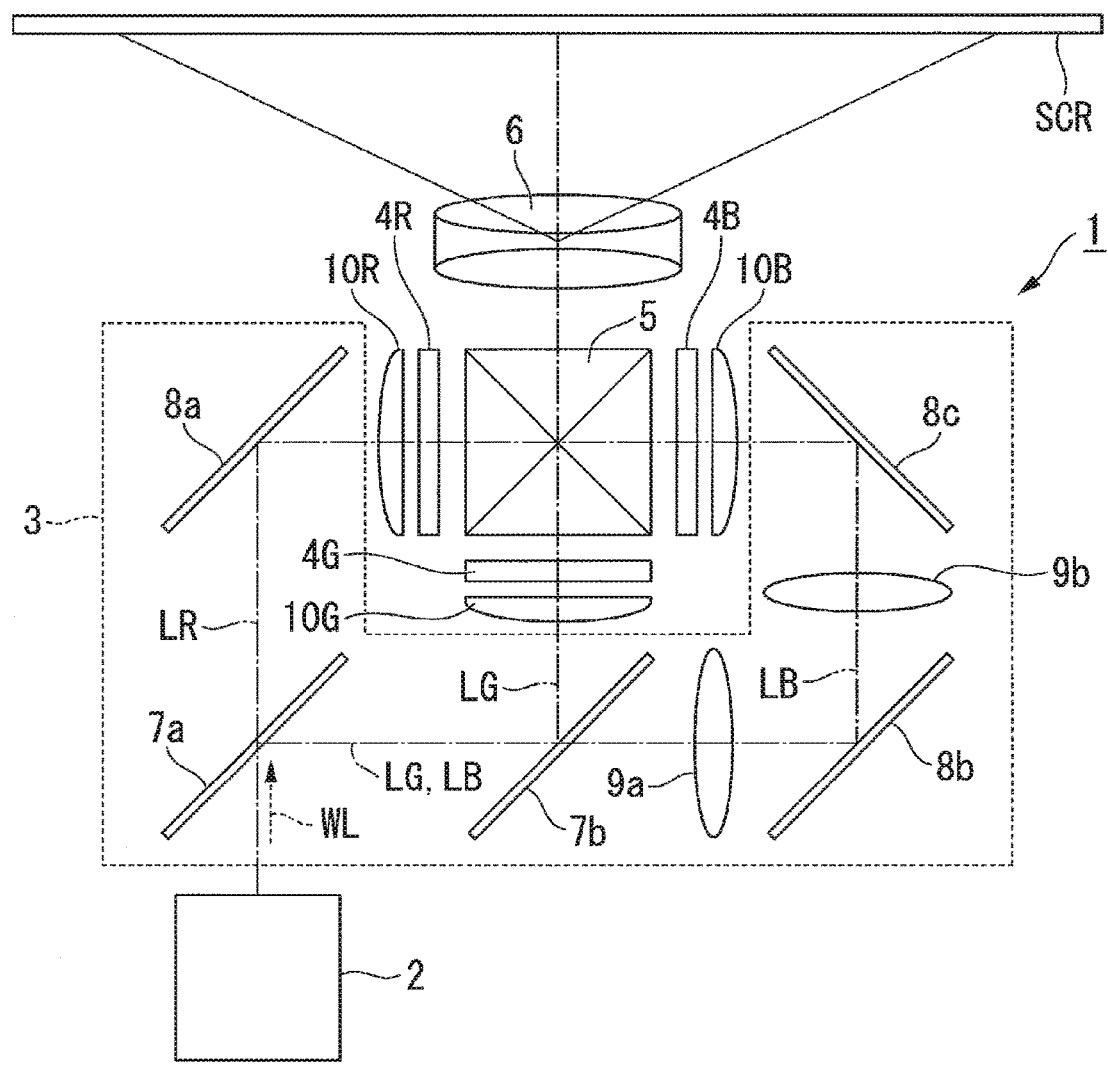
FIG. 1 is a schematic configuration diagram of a projector according to a first embodiment of the invention.

FIG. 1 is a schematic configuration diagram of a projector 1 according to the present embodiment.

As shown in FIG. 1, the projector 1 according to the present embodiment is a projection-type image display device for displaying a color picture on a screen SCR. The projector 1 is provided with an illumination device 2, a color separation optical system 3, a light modulation device 4R, a light modulation device 4G, a light modulation device 4B, a combining optical system 5, and a projection optical system 6. A configuration of the illumination device 2 will be described later.

The color separation optical system 3 separates white illumination light WL having been emitted from the illumination device 2 into red light LR, green light LG, and blue light LB. The color separation optical system 3 is generally provided with a first dichroic mirror 7a, a second dichroic mirror 7b, a first total reflection mirror 8a, a second total reflection mirror 8b, a third total reflection mirror 8c, a first relay lens 9a and a second relay lens 9b.

The first dichroic mirror 7a separates the illumination light WL from the illumination device 2 into the red light LR and the other light including the green light LG and the blue light LB. The first dichroic mirror 7a transmits the red light LR thus separated, and at the same time reflects the other light including the green light LG and the blue light LB. Incidentally, the second dichroic mirror 7b reflects the green light LG and at the same time transmits the blue light LB to thereby separate the other light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected from the second dichroic mirror 7b toward the light modulation device 4G.

The first relay lens 9a and the second relay lens 9b are disposed on the light emission side of the second dichroic mirror 7b in the light path of the blue light LB. The first relay lens 9a and the second relay lens 9b have a function of compensating the optical loss of the blue light LB due to the fact that the light path length of the blue light LB is longer than the light path lengths of the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As each of the light modulation device 4R, the light modulation device 4G, and the light modulation device 4B, there is used, for example, a transmissive liquid crystal panel. Further, on the incident side and the exit side of each of the liquid crystal panels, there are respectively disposed polarization plates (not shown).

On the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate the red light LR, the green light LG, and the blue light LB entering the light modulation device 4R, the light modulation device 4G, and the light modulation device 4B, respectively.

The image light from the light modulation device 4R, the image light from the light modulation device 4G, and the image light from the light modulation device 4B enter the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is constituted by a projection lens group, and projects the image light combined by the combining optical system 5 toward the screen SCR in an enlarged manner. Thus, the color picture enlarged is displayed on the screen SCR.

Illumination Device

The configuration of the illumination device 2 will be described.

Figure 2:
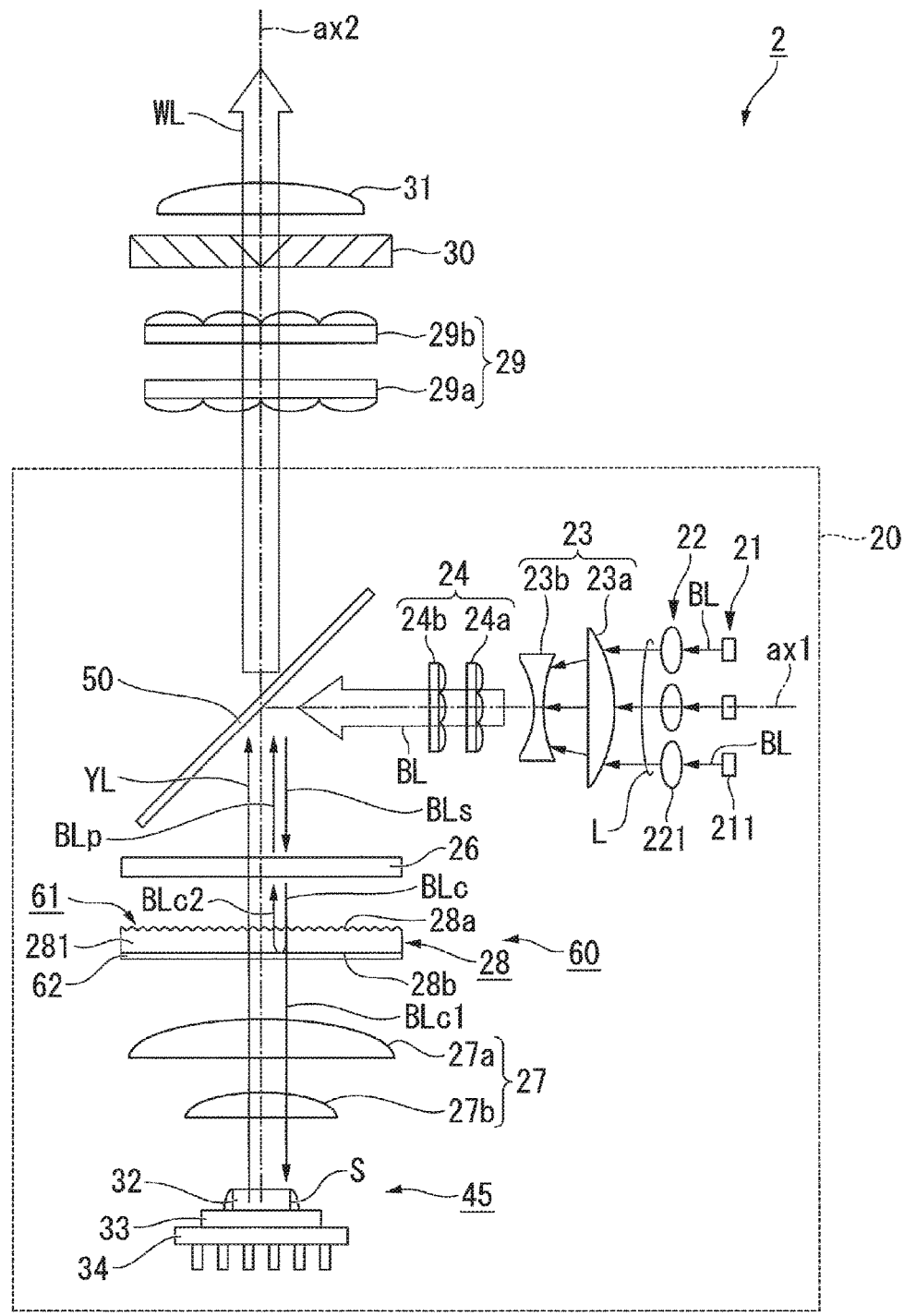
FIG. 2 is a schematic configuration diagram of an illumination device according to the first embodiment.

FIG. 2 is a diagram showing a schematic configuration of the illumination device 2.

As shown in FIG. 2, the illumination device 2 is provided with a light source device 20, an integrator optical system 29, a polarization conversion element 30, and a superimposing optical system 31.

The light source device 20 is provided with a light source section 21, a collimator optical system 22, an afocal optical system 23, a homogenizer optical system 24, a polarization separation element 50, a diffusion optical system 60, and a wavelength conversion element 45. The diffusion optical system 60 is provided with a wave plate 26, an optical element 28, and a light collection optical system 27.

The light source section 21, the collimator optical system 22, the afocal optical system 23, the homogenizer optical system 24, and the polarization separation element 50 are disposed on an optical axis ax1 coinciding with the central axis of a pencil L emitted from the light source section 21. On the other hand, the wavelength conversion element 45, the light collection optical system 27, the optical element 28, the wave plate 26, the polarization separation element 50, the integrator optical system 29, the polarization conversion element 30, and the superimposing optical system 31 are disposed on an optical axis ax2 perpendicular to the optical axis ax1.

The light source section 21 is provided with a plurality of semiconductor lasers 211 (light emitting elements). Specifically, the plurality of semiconductor lasers 211 is arranged in an array in a plane perpendicular to the optical axis ax1. The semiconductor lasers 211 each emit a blue light beam BL having a peak wavelength in a wavelength band of, for example, 440 through 480 nm. The blue light beam BL emitted from each of the semiconductor lasers 211 is emitted in parallel to the optical axis ax1 toward the polarization separation element 50. The plurality of blue light beams BL emitted from the plurality of semiconductor lasers 211 constitutes the pencil L.

All of the semiconductor lasers 211 are arranged so that each of the blue light beams BL emitted from the respective semiconductor lasers 211 enters the polarization separation element 50 as S-polarized light. In the following descriptions, the polarization direction of the light is assumed as a polarization direction with respect to the polarization separation element 50 unless otherwise noted. Specifically, the semiconductor lasers 211 each emit the blue light beam BL (the light having a first polarization direction and a first wavelength), which is S-polarized light, and has the peak wavelength in the wavelength band of 440 through 480 nm.

The blue light beams BL emitted from the light source section 21 enter the collimator optical system 22. The collimator optical system 22 converts the blue light beams BL emitted from the light source section 21 into parallel light beams. The collimator optical system 22 is constituted by a plurality of collimator lenses 221 arranged in an array so as to correspond to the arrangement of, for example, the plurality of semiconductor lasers 211.

The blue light beams BL having been transmitted through the collimator optical system 22 to thereby be converted into the parallel light beams enter the afocal optical system 23. The afocal optical system 23 reduces the beam diameter of the pencil L constituted by the plurality of blue light beams BL. The afocal optical system 23 is constituted by, for example, a convex lens 23a and a concave lens 23b.

In the present embodiment, the convex lens 23a is an aspherical lens having a convex surface as a plane of incidence of light formed of an aspheric surface. The convex lens 23a has a function of converging the plurality of blue light beams BL from the collimator optical system 22 so as to approach the optical axis ax1. The convex lens 23a is formed of a general glass material, and is higher in thermal expansion coefficient than quartz.

In the present embodiment, the concave lens 23b is formed of a biconcave lens, both surfaces of which located on the plane-of-incidence-of-light side and on the light exit side are each formed of a concave surface. The concave lens 23b has a function of converting the plurality of blue light beams BL having been converged by the convex lens 23a into parallel light beams parallel to the optical axis ax1. The concave lens 23b is a lens (a quartz lens) formed of quartz. Therefore, the thermal expansion coefficient of the concave lens 23b is lower than that of the general glass material.

Based on the configuration described above, the afocal optical system 23 reduces the beam diameter of the pencil L constituted by the plurality of blue light beams BL, and then makes the pencil L enter the homogenizer optical system 24.

The homogenizer optical system 24 homogenizes the illuminance distribution in an illumination target area (the phosphor layer 32) of the light source device 20. The homogenizer optical system 24 is constituted by, for example, a first multi-lens array 24a and a second multi-lens array 24b. The lenses of the first multi-lens array 24a divide the light emitted from the afocal optical system 23 into a plurality of light beams, and then make the light beams enter the corresponding lenses of the second multi-lens array 24b.

The polarization separation element 50 is arranged so as to form an angle of 45° with respect to each of the optical axis ax1 and the optical axis ax2. The polarization separation element 50 has a polarization separation function with respect to the blue light beams BL having the first wavelength. In the present embodiment, the polarization separation element 50 reflects the S-polarization component of the blue light beams BL and transmits the P-polarization component of the blue light beams BL. Further, the polarization separation element 50 also has a color separation function of transmitting the light with a second wavelength (in a wavelength band of the yellow light) different from the first wavelength (in the wavelength band of the blue light) irrespective of the polarization state. Therefore, the polarization separation element 50 of the present embodiment reflects the S-polarization component of the blue light, transmits the P-polarization component of the blue light, and transmits the yellow fluorescence YL. As described above, the polarization separation element 50 emits the P-polarization component of the blue light and the yellow fluorescence YL toward roughly the same directions from the polarization separation element 50.

In the case of the present embodiment, the blue light beams BL emitted from the semiconductor lasers 211 enter the polarization separation element 50 as the S-polarized light with respect to the polarization separation element 50 as described above. Therefore, the blue light beams BL having entered the polarization separation element 50 are reflected toward the wavelength conversion element 45 as blue light beams BLs in the S-polarized state.

The wave plate 26 is disposed in the light path between the polarization separation element 50 and the wavelength conversion element 45. The wave plate 26 is formed of a quarter-wave plate with respect to the wavelength of the blue light beams BLs. The wave plate 26 converts the blue light beams BLs as the S-polarized light into, for example, blue light beams BLc as clockwise circularly-polarized light, and converts blue light beams BLc2 as counterclockwise circularly-polarized light into blue light beams BLp as P-polarized light. Subsequently, for example, the blue light beams BLc as the clockwise circularly-polarized light enter the optical element 28.

Figure 3:
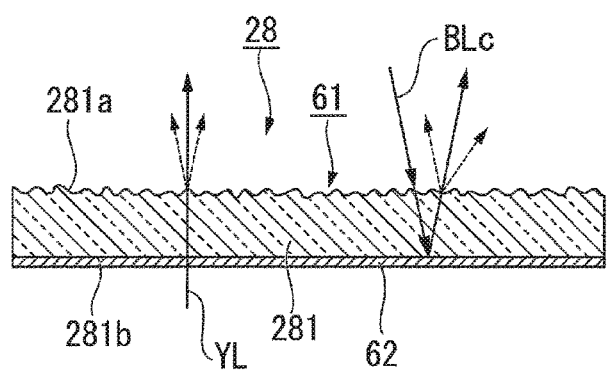
FIG. 3 is a cross-sectional view of an optical element of the first embodiment.

FIG. 3 is a cross-sectional view of the optical element 28 of the first embodiment.

As shown in FIG. 3, the optical element 28 is constituted by a plate body 281 formed of a light transmissive material such as sapphire, diamond, quartz, or ceramics. Further, these materials are preferable on the grounds that these materials enhance the thermal diffusivity of the optical element 28 to improve the reliability. Hereinafter, out of the two surfaces of the plate body 281, the surface located on the polarization separation element 50 side is referred to as a first surface 281a, and the surface located on the wavelength conversion element 45 side is referred to as a second surface 281b.

A diffusion section 61 is disposed on the first surface 281a of the plate body 281, and a light separation section 62 is disposed on the second surface 281b of the plate body 281. As shown in FIG. 2, the optical element 28 has the diffusion section 61 for diffusing the blue light beams BLc when the blue light beams BLc pass therethrough, and has the light separation section 62 for reflecting a part BLc2 of the blue light beams BLc propagating inside toward the diffusion section 61, transmitting another part BLc1 of the blue light beams BLc, and transmitting the yellow fluorescence YL.

The diffusion section 61 has a configuration in which the first surface 281a of the plate body 281 is provided with a fine concave-convex structure. The sizes, the shapes, the intervals and so on of the concave parts and the convex parts constituting the concave-convex structure can also be irregular, and the concave-convex structure of this kind can be obtained by, for example, performing a frosting treatment on one surface of the plate body 281 formed of the light transmissive material described above. The diffusion section 61 diffuses the blue light beam BLc (the light with the first wavelength) when the blue light beams BLc pass therethrough.

The light separation section 62 is constituted by a dichroic mirror for reflecting a part of the blue light beams BLc which have propagated inside the optical element to reach the light separation section 62, toward the diffusion section 61, transmitting another part BLc1 of the blue light beams BLc, and transmitting the yellow fluorescence YL (the light with the second wavelength).

The dichroic mirror is constituted by, for example, a dielectric multilayer film disposed on the second surface 281b of the plate body 281 described above. The ratio in light intensity between the blue light beams BLc2 to be reflected by the light separation section 62 and the blue light beams BLc1 to be transmitted through the light separation section 62 can arbitrarily be changed by changing the configuration of the dichroic mirror (the dielectric multilayer film). From the viewpoint of making it easy to achieve a white balance of the illumination light WL emitted from the light source device 20, it is desirable for the ratio described above to be set to, for example, roughly 20% of reflected light intensity to roughly 80% of transmitted light intensity.

The light collection optical system 27 converges the blue light beams BLc1 (the light with the first wavelength) toward the phosphor layer 32 of the wavelength conversion element 45. The light collection optical system 27 is constituted by, for example, a first condenser lens 27a (a light collection optical element) and a second condenser lens 27b (a light collection optical element).

The wavelength conversion element 45 is provided with the phosphor layer 32, a reflecting layer (not shown), a substrate 33 for supporting the phosphor layer 32, and a heatsink 34. The blue light beams BLc1 enter the phosphor layer 32 from an opposite side to the substrate 33. The phosphor layer 32 includes a phosphor to be excited when absorbing the blue light beams BLc1. The phosphor having been excited by the blue light beams BLc1 generates yellow fluorescence YL having the peak wavelength in a wavelength band of, for example, 500 through 700 nm as the light with the second wavelength different from the first wavelength.

The reflecting layer is provided on a surface on an opposite side of the phosphor layer 32 to the side which the blue light beams BLc enter. The reflecting layer can be formed of, for example, metal such as silver high in optical reflectivity. Alternatively, in the case in which the substrate 33 is formed of a light reflective material, it is not necessarily required to dispose the reflecting layer.

The phosphor layer 32 is fixed to the substrate 33 with an inorganic adhesive S having light reflectivity disposed on the side surface of the phosphor layer 32. The heatsink 34 is disposed on a surface of the substrate 33 on the opposite side to the surface for supporting the phosphor layer 32.

A part of the fluorescence YL generated in the phosphor layer 32 propagates toward the substrate 33, and the part of the fluorescence YL is reflected by the reflecting layer, and is then emitted upward from the phosphor layer 32. Further, another part of the fluorescence YL propagates toward the opposite side (upward) to the substrate 33, and the another part of the fluorescence YL is emitted outside the phosphor layer 32 without the intervention of the reflecting layer. In such a manner, the yellow fluorescence YL is emitted from the phosphor layer 32 toward the polarization separation element 50.

The integrator optical system 29 homogenizes the illumination distribution in the liquid crystal panel of each of the light modulation devices 4R, 4G, and 4B as the illumination target area of the illumination device 2. The integrator optical system 29 is constituted by a first lens array 29a and a second lens array 29b. The first lens array 29a and the second lens array 29b each have a configuration having a plurality of lenses arranged in an array. The illumination light WL having been transmitted through the integrator optical system 29 enters the polarization conversion element 30.

The polarization conversion element 30 converts the illumination light WL into predetermined linearly-polarized light. The illumination light WL having passed through the polarization conversion element 30 enters the superimposing optical system 31.

The superimposing optical system 31 is formed of a superimposing lens. The illumination light WL is transmitted through the superimposing optical system 31 to thereby be superimposed on the plane of incidence of light of each of the light modulation devices 4R, 4G, and 4B as the illumination target area, and is homogenized in the illuminance distribution.

Here, a function of the diffusion optical system 60 in the light source device 20 will be described.

The blue light beams BLs as the S-polarized light having entered the diffusion optical system 60 are transmitted through the wave plate 26 to thereby be converted into, for example, the blue light beams BLc as the clockwise circularly-polarized light. Then, the blue light beams BLc are diffused by the diffusion section 61 when entering the first surface 28a of the optical element 28, then propagate inside the optical element 28, and then reach the light separation section 62 of the second surface 28b of the optical element 28.

The blue light beams BLc2 (e.g., the light having a proportion of 20%), which are a part of the blue light beams BLc having entered the light separation section 62, are reflected by the light separation section 62 to propagate toward the diffusion section 61, then pass through the diffusion section 61, and are diffused once again when emitted therefrom. In other words, the blue light beams BLc2 having been reflected by the light separation section 62, which are a part of the blue light beams LBc, are diffused twice by the diffusion section 61 when reciprocating in the optical element 28 to pass the diffusion section 61 twice. Further, the blue light beams BLc2 reflected by the light separation section 62 are converted from the clockwise circularly-polarized light into the counterclockwise circularly-polarized light. The blue light beams BLc2 having been converted into the counterclockwise circularly-polarized light are transmitted through the wave plate 26 to thereby be converted into the blue light beams BLp as the P-polarized light having a polarization direction different from one at the moment when first entering the diffusion optical system 60. The light beams BLp as the P-polarized light are transmitted through the polarization separation element 50.

In contrast, the blue light beams BLc1 (e.g., the light having a proportion of 80%), which are the rest of the blue light beams BLc having entered the light separation section 62, are transmitted through the light separation section 62, and then enter the phosphor layer 32 of the wavelength conversion element 45 via the light collection optical system 27. The blue light beams BLc1 having entered the phosphor layer 32 excite the phosphor in the phosphor layer 32, and are wavelength-converted into the yellow fluorescence YL.

The fluorescence YL having been emitted from the phosphor layer 45 toward the polarization separation element is transmitted through the light collection optical system 27, the optical element 28, and the wave plate 26 in series. The fluorescence YL is unpolarized light, and therefore enters the polarization separation element 50 as the unpolarized light even after passing through the wave plate 26. The fluorescence YL is transmitted through the polarization separation element 50 having no polarization separation function with respect to the wavelength band of the yellow light. In such a manner as described above, the blue light beams BLp and the yellow fluorescence YL are emitted from the polarization separation element 50 toward the same direction. Thus, the white illumination light WL is emitted from the light source device 20 toward the integrator optical system 29.

As described above, the blue light beams BLc2 are diffused twice by the diffusion section 61, but the fluorescence YL passes through the optical element 28 once, and is therefore diffused once by the diffusion section 61. The fluorescence YL has a Lambert diffusion angle distribution from the time point when emitted from the phosphor layer 32 unlike the blue light beams BL emitted from the semiconductor lasers 211. Therefore, there is a problem that the light loss occurs in the posterior stage of the diffusion section 61 if the fluorescence YL is diffused too strongly by the diffusion section 61.

However, in the case of the present embodiment, since it is only required that the desired diffusion angle distribution can be obtained in two diffusion operations with respect to the blue light beams BLc2, it is possible to achieve a balance between the diffusion angle distribution of the blue light beams BLc2 and the diffusion angle distribution of the fluorescence YL while suppressing the light loss in the case of excessively diffusing the fluorescence YL.

As described above, according to the present embodiment, it is possible to dispose the diffusion section 61 and the wavelength conversion element 45 on one light path, and there is no need to separately dispose the optical system for guiding the light to the diffusion section 61 and the optical system for guiding the light to the wavelength conversion element 45. Thus, it is possible to realize the light source device 20 small in size and capable of emitting the light having the necessary diffusion angle distribution.

Further, in the light source device 20 according to the present embodiment, since the optical element is disposed in the anterior stage of the wavelength conversion element 45, the blue light beams not making a contribution to the excitation of the phosphor layer 32 are separated by the light separation section 62 of the optical element 28, and do not have a chance to be used for irradiating the phosphor layer 32. Therefore, unnecessary rise in temperature of the phosphor layer 32 is prevented, and it is possible to suppress the deterioration of the light conversion efficiency of the phosphor layer 32.

Modified Examples of Optical Element

Figure 4:
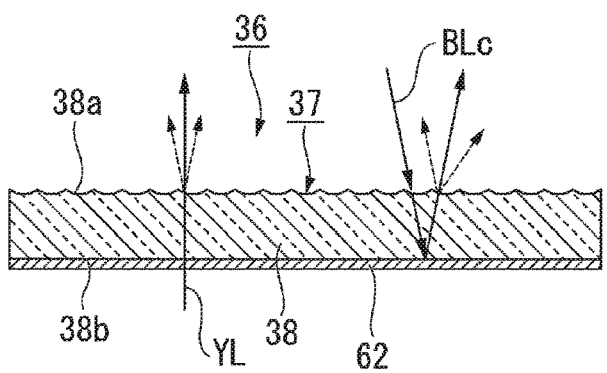
FIG. 4 is a cross-sectional view showing an optical element according to a first modified example.
Figure 5:
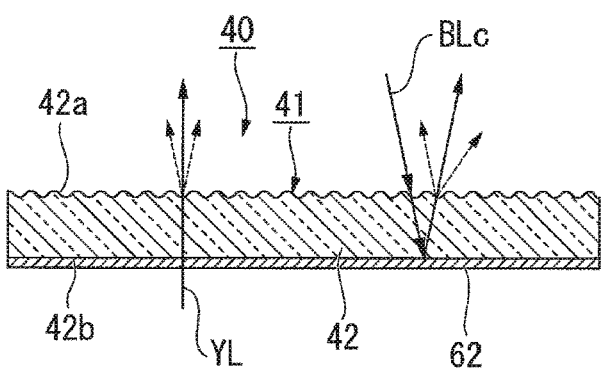
FIG. 5 is a cross-sectional view showing an optical element according to a second modified example.

It should be noted that it is also possible to use an optical element shown in FIG. 4 or FIG. 5 instead of the optical element 28 illustrated in the present embodiment.

FIG. 4 is a cross-sectional view showing an optical element 36 of a first modified example.

As shown in FIG. 4, the optical element 36 of the first modified example is provided with a diffusion section 37, and a light separation section 62. In the present modified example, as the diffusion section 37, there is provided a lens array structure constituted by a plurality of concave lens surfaces to a first surface 38a of a plate body 38 having a light transmissive property. Each of the concave lens surfaces is a semispherical surface.

FIG. 5 is a cross-sectional view showing an optical element 40 of a second modified example.

As shown in FIG. 5, the optical element 40 of the second modified example is provided with a diffusion section 41, and a light separation section 62. In the present modified example, as the diffusion section 41, there is provided a regular concave-convex structure to a first surface 42a of a plate body 42 having a light transmissive property.

Second Embodiment

Hereinafter, a second embodiment of the invention will be described using FIG. 6.

A projector according to the second embodiment is roughly the same in basic configuration as that of the first embodiment, but is different in the configuration of the light source device from that of the first embodiment. Therefore, the description of the whole of the projector will be omitted, and only the light source device will be described.

Figure 6:
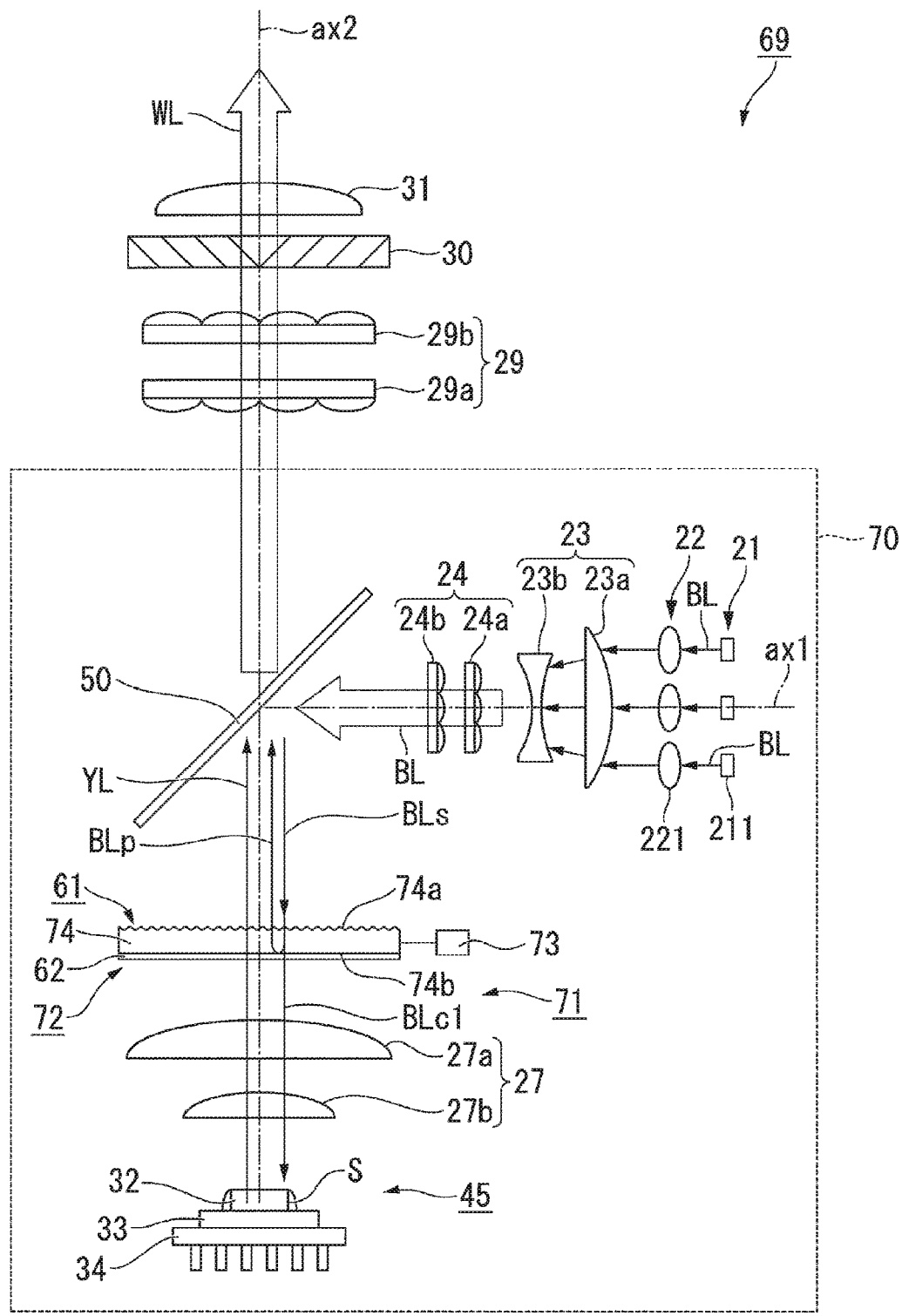
FIG. 6 is a schematic configuration diagram of an illumination device according to a second embodiment of the invention.

FIG. 6 is a schematic configuration diagram of an illumination device according to the second embodiment.

In FIG. 6, the constituents common to the drawings used in the first embodiment are denoted by the same reference symbols, and the description thereof will be omitted.

As shown in FIG. 6, in the illumination device 69 according to the present embodiment, the light source device is provided with the light source section 21, the collimator optical system 22, the afocal optical system 23, the homogenizer optical system 24, the polarization separation element 50, a diffusion optical system 71, and the wavelength conversion element 45. The diffusion optical system 71 is provided with an optical element 72, a drive section 73, and a light collection optical system 27.

The optical element 72 of the present embodiment is constituted by a plate body 74 (a wave plate) formed of a light transmissive material having birefringence. Thus, the optical element 72 functions as a quarter-wave plate with respect to the wavelength of the blue light beams BLs. In other words, the optical element 72 functions as both of the optical element 28 and the wave plate 26 of the first embodiment. Similarly to the first embodiment, in the optical element 72, the diffusion section 61 is disposed on a first surface 74a of the plate body 74, and the light separation section 62 is disposed on a second surface 74b of the plate body 74.

The drive section 73 drives the optical element 72 in a direction perpendicular to the optical axis ax2. Specifically, the drive section 73 can vibrate or swing, for example, the optical element 72. As the drive section 73, there is used a well-known drive mechanism including a motor or the like. Alternatively, the drive section 73 can rotate the optical element 72.

The rest of the configuration of the light source device 70 is substantially the same as in the first embodiment.

In the case of the present embodiment, the blue light beams BLp (e.g., the light having a proportion of 20%), which are a part of the blue light beams BLs as the S-polarized light having entered the optical element 72, reciprocate in the optical element 72 to pass through the diffusion section 61 twice to thereby be diffused twice by the diffusion section 61. On this occasion, since a phase difference of a half wavelength is provided in the blue light beams BLs in the reciprocal motion, the blue light beams BLs as the S-polarized light are converted into the blue light beams BLp as the P-polarized light. The light beams BLp as the P-polarized light are transmitted through the polarization separation element 50.

In contrast, the blue light beams BLc1 having been transmitted through the light separation section 62 excite the phosphor in the phosphor layer 32 to thereby be wavelength-converted into the yellow fluorescence YL. The behavior of the fluorescence YL is substantially the same as in the first embodiment.

Also in the present embodiment, there can be obtained substantially the same advantage that the light source device 70 small in size and capable of emitting the light having a necessary diffusion angle distribution can be realized.

Further, in the case of the present embodiment, since the optical element 72 functions as both of the optical element 28 and the wave plate 26 of the first embodiment, it is possible to further miniaturize the light source device 70. Further, since the light source device 70 is provided with the drive section 73 for driving the optical element 72, the diffusion angle distribution of the blue light beams due to the diffusion section 61 is temporally superimposed in the illumination target area. Thus, the speckles can more effectively be suppressed. Further, since there is adopted the configuration of driving the optical element 72 in a direction perpendicular to the optical axis ax2, it is also possible to make a contribution to the miniaturization of the light source device 70 in the direction of the optical axis ax2.

Third Embodiment

A third embodiment of the invention will hereinafter be described using FIG. 7.

A projector according to the third embodiment is roughly the same in basic configuration as that of the first embodiment, but is different in the configuration of the light source device from that of the first embodiment. Therefore, the description of the whole of the projector will be omitted, and only the light source device will be described.

Figure 7:
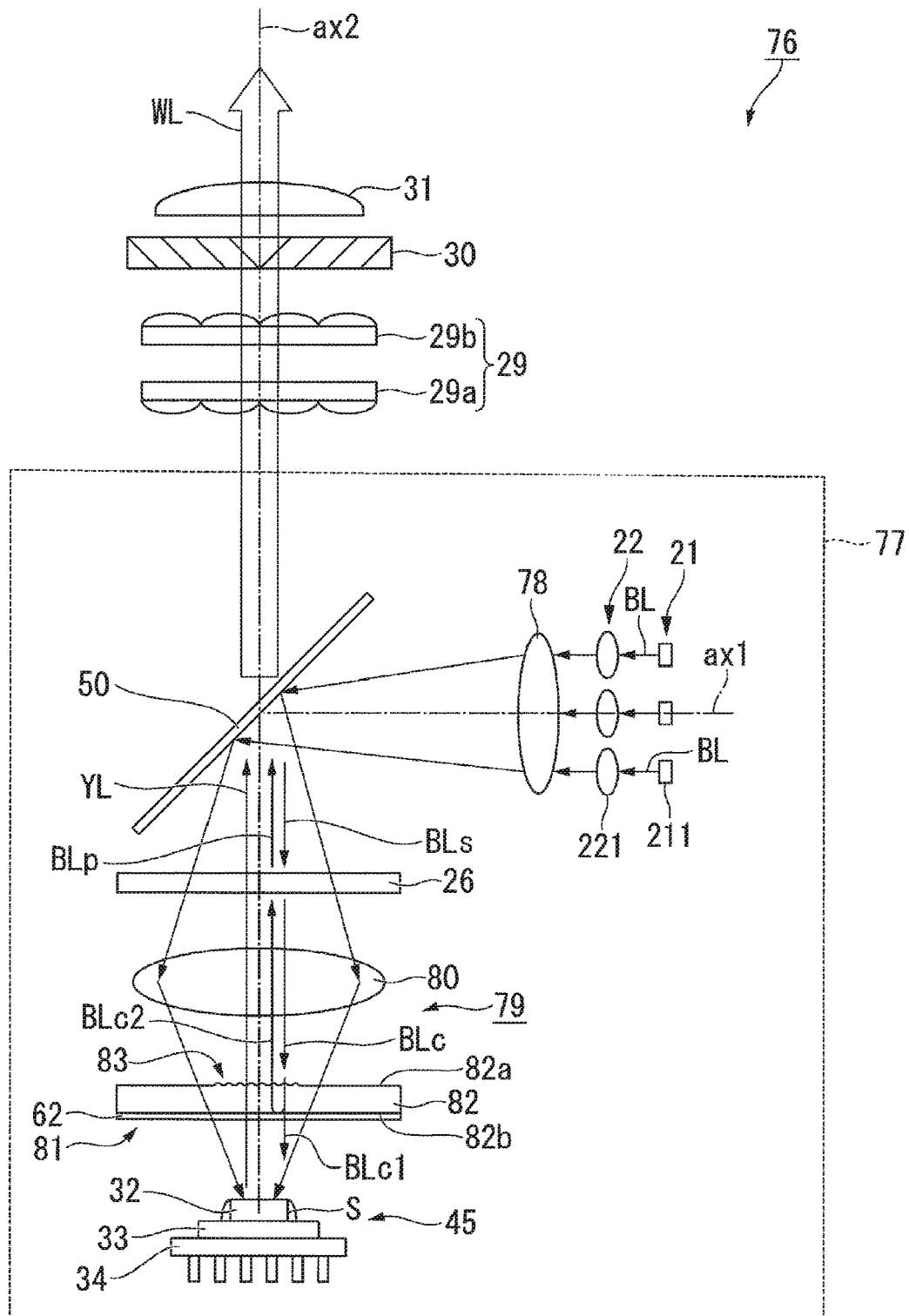
FIG. 7 is a schematic configuration diagram of an illumination device according to a third embodiment of the invention.

FIG. 7 is a schematic configuration diagram of an illumination device according to the third embodiment.

In FIG. 7, the constituents common to the drawings used in the first embodiment are denoted by the same reference symbols, and the description thereof will be omitted.

As shown in FIG. 7, in the illumination device 76 according to the present embodiment, the light source device is provided with the light source section 21, the collimator optical system 22, a first condenser lens 78, the polarization separation element 50, a diffusion optical system 79, and the wavelength conversion element 45. The diffusion optical system 79 is provided with the wave plate 26, a second condenser lens 80 (a light collection optical system), and an optical element 81. The first condenser lens 78 converges the blue light beams BL emitted from the light source section 21 toward the polarization separation element 50.

The second condenser lens 80 is disposed on the light path between the wave plate 26 and the optical element 81. The second condenser lens 80 converges the blue light beams BL toward the wavelength conversion element 45. In other words, the diffusion optical system 79 is provided with a light collection optical system including at least one condenser lens, and converging the blue light beams toward the wavelength conversion element 45.

The optical element 81 is provided with a diffusion section 83 disposed on a first surface 82a of a plate body 82. The optical element 81 is disposed on the light path between the second condenser lens 80 and the wavelength conversion element 45. Therefore, the blue light beams BLc1 converged by the second condenser lens 80 enter the optical element 81. Therefore, the diffusion section 83 is disposed on the blue light beams BLc1 converged by the second condenser lens 80.

In contrast to the fact that the diffusion section 61 is disposed in the entire area of the first surface of the plate body 281 in the first embodiment, the diffusion section 83 is disposed in a part of the irradiation area with the blue light beams BLc1 thus converged out of the first surface 82a of the plate body 82 in the present embodiment. Specifically, the diffusion section 83 is disposed in an area crossing the optical axis of the blue light beams BLc1, namely a central area adjacent to the optical axis of the blue light beams BLc1. The central area crosses the optical axis of the blue light beams BLc1.

The rest of the configuration of the light source device 77 is substantially the same as in the first embodiment.

Also in the present embodiment, there can be obtained substantially the same advantage that the light source device 77 small in size and capable of emitting the light having a necessary diffusion angle distribution can be realized.

It is an advantage of the light source device 77 that the blue light beams BLc2 pass through the diffusion section 83 twice to thereby be sufficiently diffused. However, if the diffusion angle distribution of the blue light beams BLc2 becomes too broad, there occurs the blue light beams which cannot be captured by the second condenser lens 80 out of the blue light beams BLc2 emitted from the optical element 81, and thus, there occurs a loss of the blue light beams in the second condenser lens 80. With respect to this problem, according to the present embodiment, since the diffusion section 83 is disposed in only the area crossing the blue light beams BLc2, namely the central area adjacent to the optical axis of the blue light beams BLc2, there is no chance that the diffusion angle distribution of the blue light beams BLc2 becomes too broad, and it is possible to improve the utilization efficiency of the blue light beams BLc2. It should be noted that it is sufficient to set the size of the formation area of the diffusion section 83 in accordance with the necessary diffusion angle distribution of the blue light beams BLc2. It should be noted that the central area crosses the optical axis of the blue light beams BLc2.

Fourth Embodiment

A fourth embodiment of the invention will hereinafter be described using FIG. 8.

A projector according to the fourth embodiment is roughly the same in basic configuration as that of the first embodiment, but is different in the configuration of the light source device from that of the first embodiment. Therefore, the description of the whole of the projector will be omitted, and only the light source device will be described.

Figure 8:
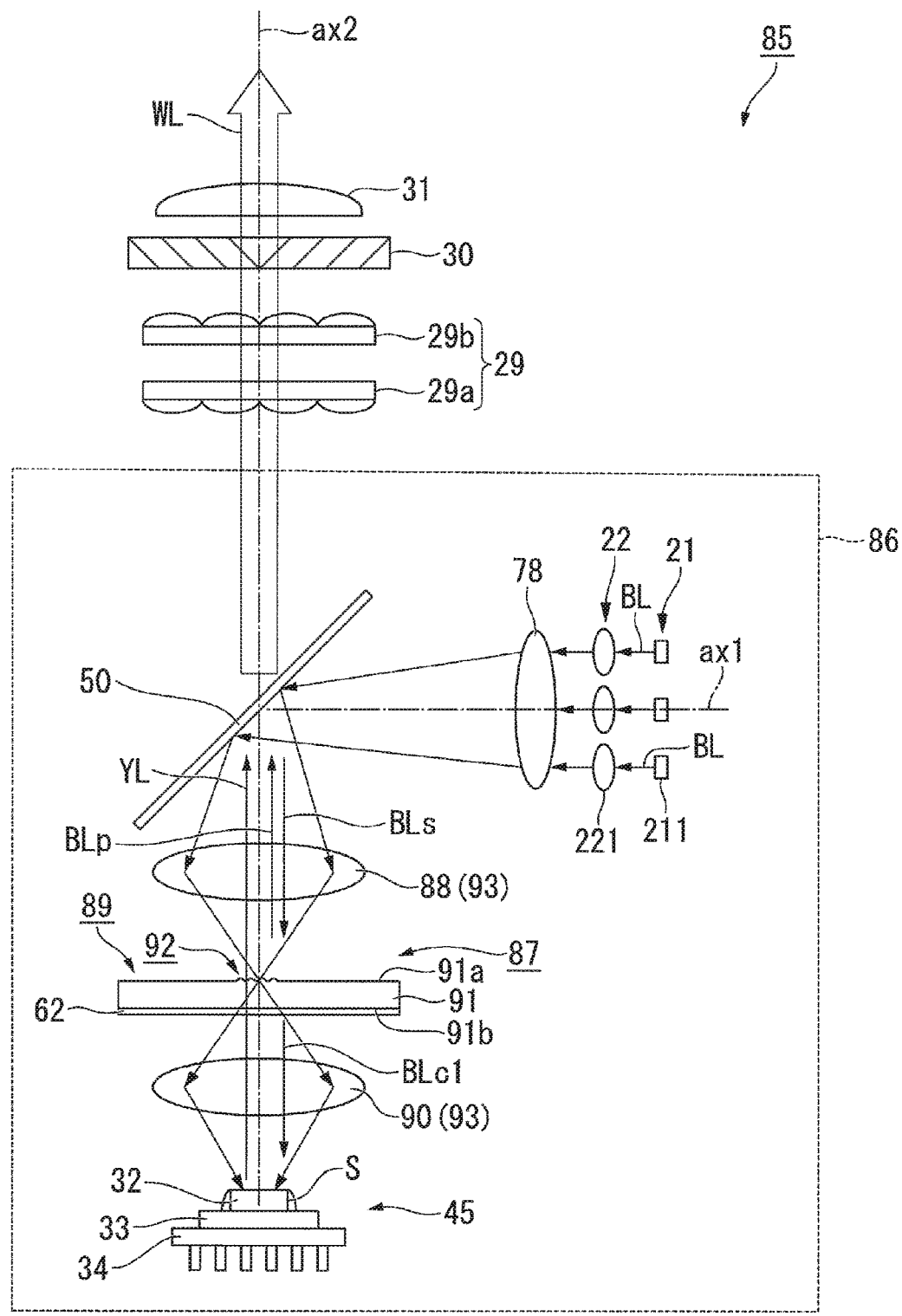
FIG. 8 is a schematic configuration diagram of an illumination device according to a fourth embodiment of the invention.

FIG. 8 is a schematic configuration diagram of an illumination device according to the fourth embodiment.

In FIG. 8, the constituents common to the drawings used in the first embodiment are denoted by the same reference symbols, and the description thereof will be omitted.

As shown in FIG. 8, in the illumination device 85 according to the present embodiment, the light source device is provided with the light source section 21, the collimator optical system 22, the first condenser lens 78, the polarization separation element 50, a diffusion optical system 87, and the wavelength conversion element 45. The diffusion optical system 87 is provided with a second condenser lens 88 (a light collection optical element), an optical element 89, and a third condenser lens 90 (a light collection optical element). The second condenser lens 88 and the third condenser lens 90 constitute a light collection optical system 93 for converging the blue light beams toward the wavelength conversion element 45.

The optical element 89 is provided with a plate body 91 having birefringence, a diffusion section 92, and a light separation section 62. The optical element 89 functions as a quarter-wave plate with respect to the wavelength of the blue light beams BLs. The diffusion section 92 is disposed in a part of the irradiation area with the blue light beams BLs out of a first surface 91a of the plate body 91 similarly to the third embodiment. Further, in the present embodiment, there is adopted a configuration in which the light collection optical system 93 forms an intermediate image of the light source section 21, and the diffusion section 92 is disposed at a position of the intermediate image, or a position adjacent to the intermediate image of the semiconductor lasers 211.

The rest of the configuration of the light source device 86 is substantially the same as in the first embodiment.

Also in the present embodiment, there can be obtained substantially the same advantage that the light source device 86 small in size and capable of emitting the light having a necessary diffusion angle distribution can be realized.

Further, in the case of the present embodiment, since the diffusion section 92 is disposed at the position of the intermediate image, or the position adjacent to the intermediate image of the light emitting area of the semiconductor lasers 211, the loss of the blue light beams BLs can be suppressed, and at the same time, the diffusion efficiency of the blue light beams BLs is improved, and thus, the illuminance of the illumination light WL emitted from the polarization separation element 50 can further be homogenized.

Fifth Embodiment

A fifth embodiment of the invention will hereinafter be described using FIG. 9.

A projector according to the fifth embodiment is roughly the same in basic configuration as that of the first embodiment, but is different in the configuration of the light source device from that of the first embodiment. Therefore, the description of the whole of the projector will be omitted, and only the light source device will be described.

Figure 9:
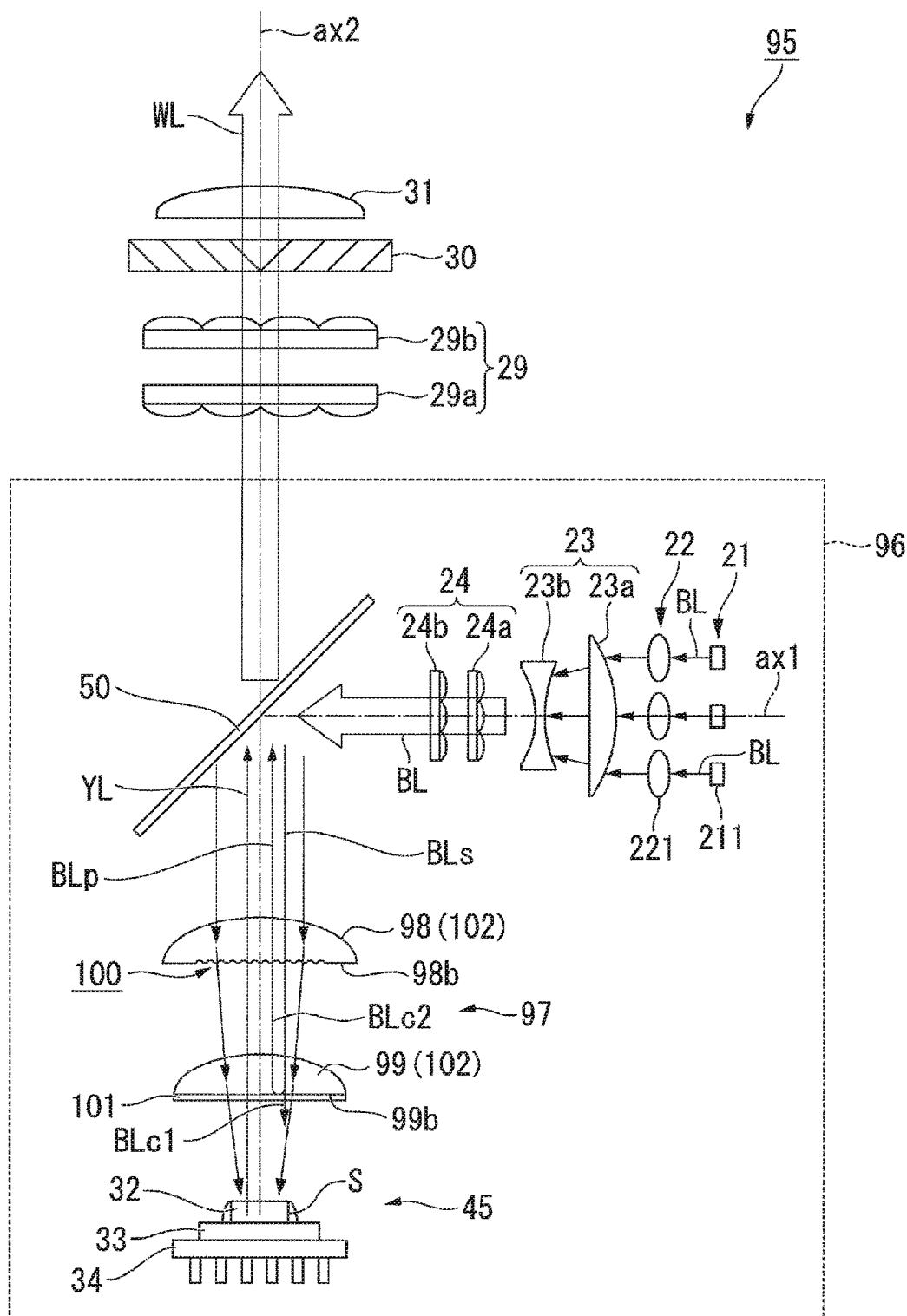
FIG. 9 is a schematic configuration diagram of an illumination device according to a fifth embodiment of the invention.

FIG. 9 is a schematic configuration diagram of an illumination device according to the fifth embodiment.

In FIG. 9, the constituents common to the drawings used in the first embodiment are denoted by the same reference symbols, and the description thereof will be omitted.

As shown in FIG. 9, in the illumination device 95 according to the present embodiment, the light source device is provided with the light source section 21, the collimator optical system 22, the afocal optical system 23, the homogenizer optical system 24, the polarization separation element 50, a diffusion optical system 97, and the wavelength conversion element 45. The diffusion optical system 97 is provided with a first condenser lens 98 (a first light collection optical element), a second condenser lens 99 (a second light collection optical element), a diffusion section 100, and a light separation section 101.

The first condenser lens 98 and the second condenser lens 99 constitute a light collection optical system 102 for converging the blue light beams toward the wavelength conversion element 45. Specifically, the light collection optical system 102 is provided with the first condenser lens 98 disposed on the side of the polarization separation element 50, and the second condenser lens 99 disposed on the side of the wavelength conversion element 45.

Each of the first condenser lens 98 and the second condenser lens 99 is formed of a plano-convex lens having a flat surface and a convex surface. Further, these plano-convex lenses are each formed of a light transmissive material having birefringence. The blue light beams BLs are transmitted through the first condenser lens 98 and the second condenser lens 99 to thereby be converged and at the same time provided with a phase difference to be changed in the polarization state. As described above, the two condenser lenses, namely the first condenser lens 98 and the second condenser lens 99, function as a quarter-wave plate with respect to the wavelength of the blue light beams BLs. It should be noted that it is also possible that either one of the first condenser lens 98 and the second condenser lens 99 is provided with the birefringence and functions as the quarter-wave plate, and the other thereof is not provided with the birefringence.

The diffusion section 100 is disposed on the flat surface 98b of the first condenser lens 98. Further, the light separation section 101 is disposed on the flat surface 99b of the second condenser lens 99.

The rest of the configuration of the light source device 96 is substantially the same as in the first embodiment.

Also in the present embodiment, there can be obtained substantially the same advantage that the light source device 96 small in size and capable of emitting the light having a necessary diffusion angle distribution can be realized.

Further, in the case of the present embodiment, since the diffusion section 100 is provided in the first condenser lens 98 constituting the light collection optical system 102, and the light separation section 101 is provided in the second condenser lens 99, there is no need to separately dispose the optical element or the wave plate, and it is possible to achieve reduction in the number of components and the miniaturization of the light source device 96.

Further, since the diffusion section 100 and the light separation section 101 are both disposed on the flat surfaces of the plano-convex lenses, respectively, it is easy to form the concave-convex structure and the dielectric multilayer film.

Sixth Embodiment

A sixth embodiment of the invention will hereinafter be described using FIG. 10.

A projector according to the sixth embodiment is roughly the same in basic configuration as that of the first embodiment, but is different in the configuration of the light source device from that of the first embodiment. Therefore, the description of the whole of the projector will be omitted, and only the light source device will be described.

Figure 10:
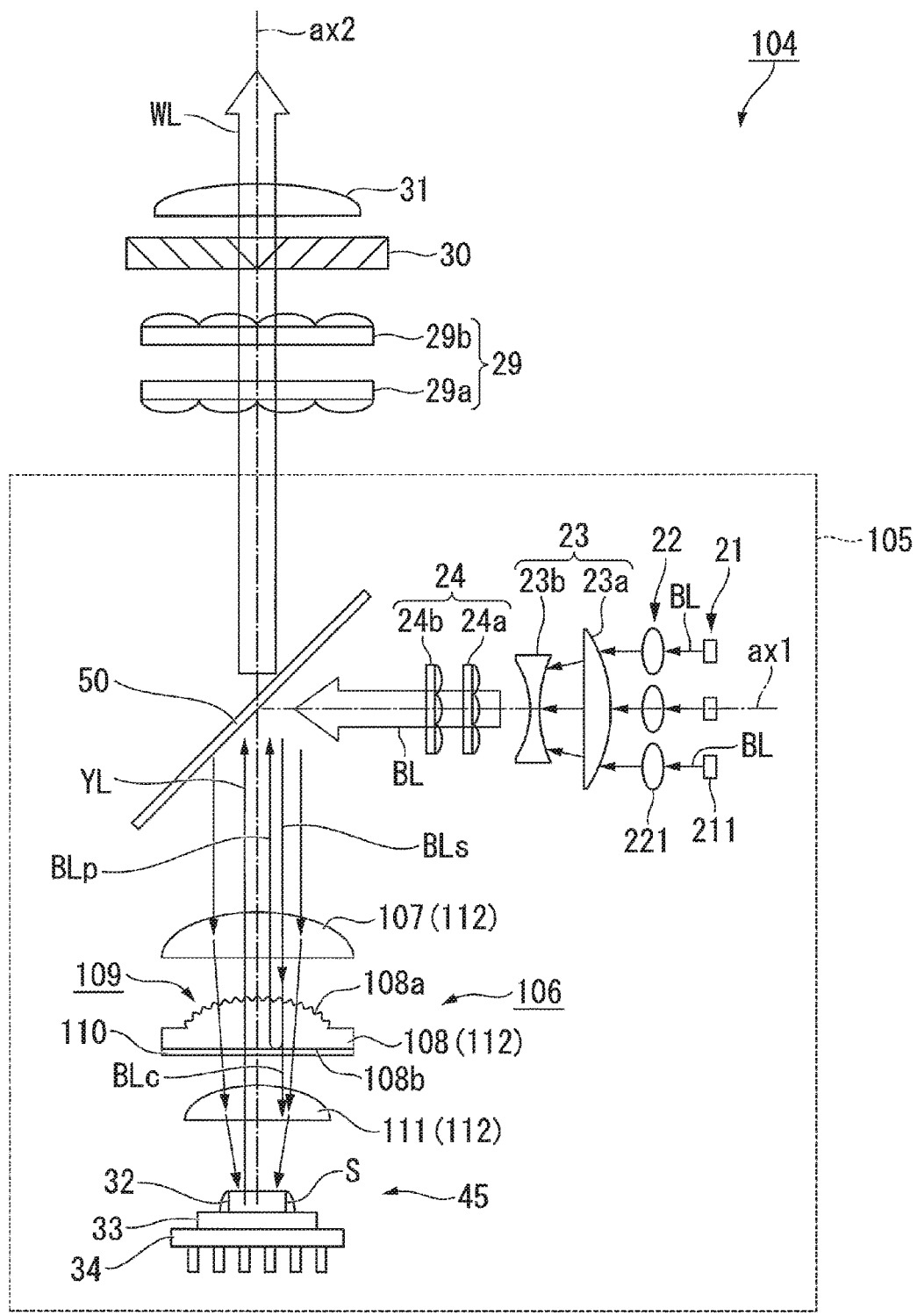
FIG. 10 is a schematic configuration diagram of an illumination device according to a sixth embodiment of the invention.

FIG. 10 is a schematic configuration diagram of an illumination device according to the sixth embodiment.

In FIG. 10, the constituents common to the drawings used in the first embodiment are denoted by the same reference symbols, and the description thereof will be omitted.

As shown in FIG. 10, in the illumination device 104 according to the present embodiment, the light source device 105 is provided with the light source section 21, the collimator optical system 22, the afocal optical system 23, the homogenizer optical system 24, the polarization separation element 50, a diffusion optical system 106, and the wavelength conversion element 45. The diffusion optical system 106 is provided with a first condenser lens 107 (the first light collection optical element), a second condenser lens 108 (the second light collection optical element), a diffusion section 109, a light separation section 110, and a third condenser lens 111.

The first condenser lens 107, the second condenser lens 108 and the third condenser lens 111 constitute a light collection optical system 112 for converging the blue light beams BLc toward the wavelength conversion element 45. Specifically, the light collection optical system 112 is provided with the first condenser lens 107 disposed on the side of the polarization separation element 50, the third condenser lens 111 disposed on the side of the wavelength conversion element 45, and the second condenser lens 108 disposed between the first condenser lens 107 and the third condenser lens 111.

Each of the first condenser lens 107, and the second condenser lens 108, and the third condenser lens 111 is formed of a plano-convex lens having a flat surface and a convex surface. Further, these plano-convex lenses are each formed of a light transmissive material having birefringence. The blue light beams BLs are transmitted through the first condenser lens 107, the second condenser lens 108 and the third condenser lens 111 to thereby be converged and at the same time provided with a phase difference to be changed in the polarization state. As described above, the three condenser lenses, namely the first condenser lens 107, the second condenser lens 108 and the third condenser lens 111, function as a quarter-wave plate with respect to the wavelength of the blue light beams BLs. It should be noted that it is also possible that at least one of the three condenser lenses 107, 108, 111 is provided with the birefringence and functions as the quarter-wave plate, and the other thereof is not provided with the birefringence.

The diffusion section 109 is disposed on the convex surface 108a (a curved surface) of the second condenser lens 108. Further, the light separation section 110 is disposed on the flat surface 108b of the second condenser lens 108.

The rest of the configuration of the light source device 105 is substantially the same as in the first embodiment.

Also in the present embodiment, there can be obtained substantially the same advantage that the light source device 105 small in size and capable of emitting the light having a necessary diffusion angle distribution can be realized.

Further, in the case of the present embodiment, since the diffusion section 109 is disposed on the convex surface 108a (the curved surface), the incident angles of the blue light beams BLs with the diffusion section 109 become smaller compared to the case in which the diffusion section is disposed on the flat surface. As a result, even in the case in which the blue light beams BLs converged to thereby be provided with angles enter the diffusion section 109, the diffusion angle distribution does not extremely broaden, and a moderate diffusion angle distribution can be obtained. Thus, vignetting of the blue light beams BLs in the first condenser lens 107 is suppressed, and it is possible to improve the utilization efficiency of the blue light beams BLs.

Seventh Embodiment

A seventh embodiment of the invention will hereinafter be described using FIG. 11, and FIG. 12A through FIG. 12C.

A projector according to the seventh embodiment is roughly the same in basic configuration as that of the first embodiment, but is different in the configuration of the light source device from that of the first embodiment. Therefore, the description of the whole of the projector will be omitted, and only the light source device will be described.

Figure 11:
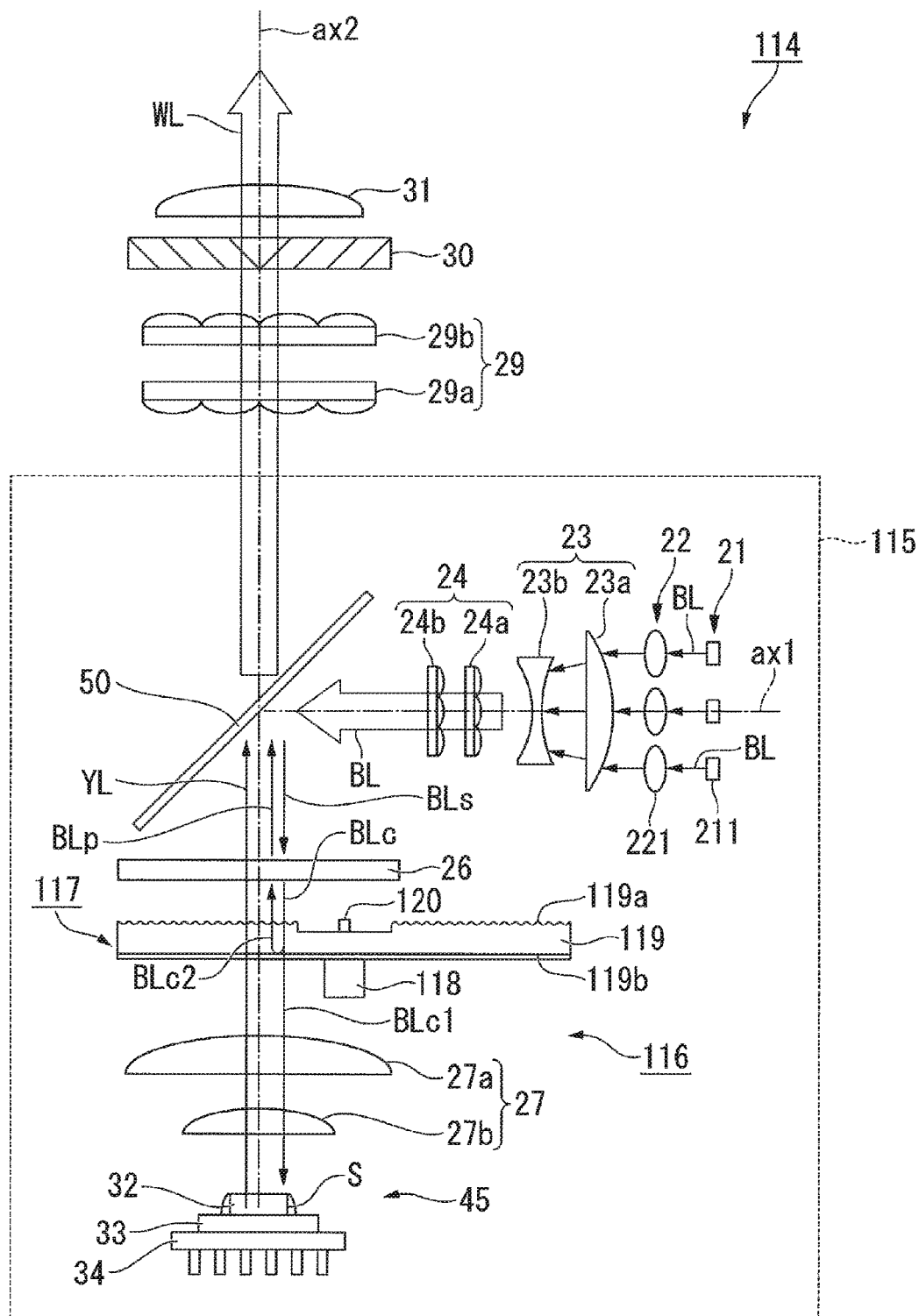
FIG. 11 is a schematic configuration diagram of an illumination device according to a seventh embodiment of the invention.
Figure 12A:
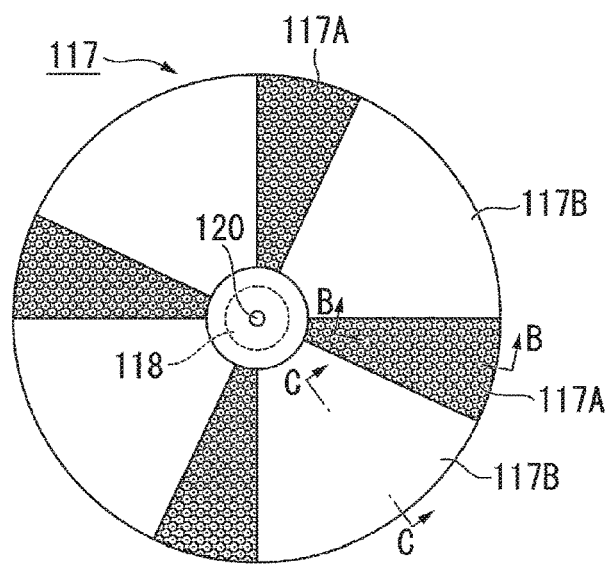
FIG. 12A is a plan view of a rotary wheel.
Figure 12B:
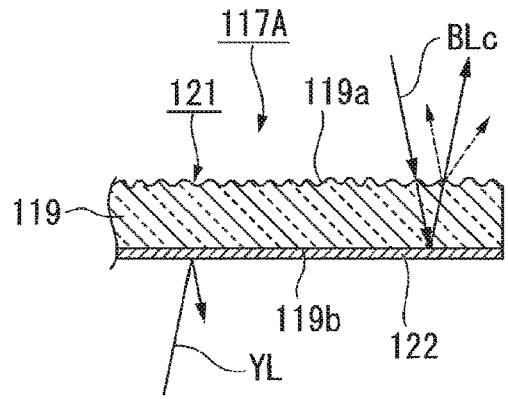
FIG. 12B is a cross-sectional view of the rotary wheel along the line B-B in FIG. 12A.
Figure 12C:
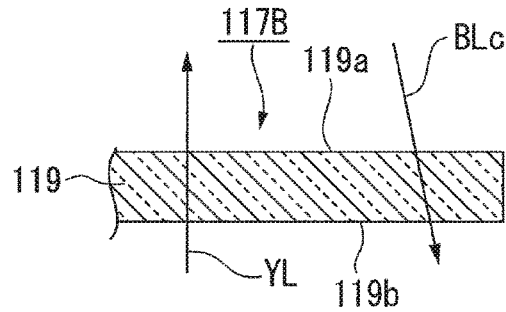
FIG. 12C is a cross-sectional view of the rotary wheel along the line C-C in FIG. 12A.

FIG. 11 is a schematic configuration diagram of an illumination device according to the seventh embodiment. FIG. 12A is a plan view of a rotary wheel. FIG. 12B is a cross-sectional view of the rotary wheel along the line B-B in FIG. 12A. FIG. 12C is a cross-sectional view of the rotary wheel along the line C-C in FIG. 12A.

In FIG. 11, the constituents common to the drawings used in the first embodiment are denoted by the same reference symbols, and the description thereof will be omitted.

As shown in FIG. 11, in the illumination device 114 according to the present embodiment, the light source device 115 is provided with the light source section 21, the collimator optical system 22, the afocal optical system 23, the homogenizer optical system 24, the polarization separation element 50, a diffusion optical system 116, and the wavelength conversion element 45. The diffusion optical system 116 is provided with the wave plate 26, a rotary wheel 117, a drive source 118, and the light collection optical system 27.

The rotary wheel 117 is provided with a plate body 119 having a first surface 119a located on the side of the polarization separation element 50, and a second surface 119b located on the side of the wavelength conversion element 45, and having a light transmissive property. The drive source 118 is formed of a motor for rotating the rotary wheel 117 around the rotary shaft 120.

As shown in FIG. 12A, the shape of the rotary wheel 117 viewed in a direction parallel to the rotary shaft 120 is a circular shape. In the rotary wheel 117, at least one first area 117A and at least one second area 117B are alternately disposed so as to be arranged in the rotational direction of the rotary wheel 117. Although the four first areas 117A and the four second areas 117B are disposed in the present embodiment, the number of the first areas 117A and the second areas 117B can arbitrarily be changed. Further, the ratio between the area of the first area 117A and the area of the second area 117B is set to, for example, 1:4.

As shown in FIG. 12B, in the first area 117A, a diffusion section 121 is provided on the first surface 119a of the plate body 119, and a mirror 122 for reflecting at least a part of the blue light beams BLc toward the diffusion section 121 is disposed on the second surface 119b of the plate body 119. In the present embodiment, it is assumed that the mirror 122 is formed of a metal film high in reflectance made of silver or the like, and reflects roughly 100% of the blue light beams BLc toward the diffusion section 121. Further, in the case in which the mirror 122 is formed of the metal film, the fluorescence YL is reflected by the mirror 122 and cannot be transmitted through the rotary wheel 117, but there is no problem since the fluorescence YL is not generated during the period in which the first area 117A is irradiated with the blue light beams BLc.

It should be noted that the mirror 122 is only required to have the function of reflecting at least a part of the blue light beams BLc toward the diffusion section 121, and can therefore be formed of a dichroic mirror for reflecting at least a part of the blue light beams BLc toward the diffusion section 121, transmitting another part thereof, and transmitting the yellow fluorescence YL similarly to the light separation section in the first through sixth embodiments described above.

As shown in FIG. 12C, in the second area 117B, nothing is disposed on the first surface 119a and the second surface 119b of the plate body 119, and the flat first surface 119a and the flat second surface 119b are exposed. According to this configuration, the second area 117B transmits almost all of the blue light beams BLc and the fluorescence YL.

When observing the rotary wheel 117 of the present embodiment area by area, in the first area 117A, roughly 100% of the blue light beams BLc are reflected by the mirror 122, and the blue light beams BLc and the fluorescence YL which are transmitted through the rotary wheel 117 hardly exist. Further, in the second area 117B, almost all of the blue light beams BLc and the fluorescence YL are transmitted through the rotary wheel 117. However, during the period in which the rotary wheel 117 rotates, since the irradiation place with the blue light beams BLc switched at high speed between the first area 117A and the second area 117B, it is possible for the rotary wheel 117 to reflect a part of the blue light beams BLc, transmit another part of the blue light beams BLc, and transmit the fluorescence YL. Therefore, it is possible to regard the entire area of the second surface 117b of the wheel 117 as the light separation section.

The rest of the configuration of the light source device 115 is substantially the same as in the first embodiment.

Also in the present embodiment, there can be obtained substantially the same advantage that the light source device 115 small in size and capable of emitting the light having a necessary diffusion angle distribution can be realized.

Further, in the case of the present embodiment, since the diffusion section 121 is provided in the rotary wheel 117, the diffusion angle distribution of the blue light beams BLc changes from moment to moment, and thus, the diffusion angle distribution is temporally superimposed in the illumination target area. Thus, the speckles can effectively be suppressed.

Further, by changing the area ratio between the first area 117A and the second area 117B in the rotary wheel 117, it is possible to control the ratio between the blue light beams BLc which are diffused twice in the diffusion section 121 and then emitted and the yellow fluorescence YL. As a result, the white balance of the illumination light WL can be controlled.

Further, in the present embodiment, since it is possible to configure the light separation section only with a simple metal film without using the dichroic mirror which requires an adjustment of the optical characteristics, manufacturing of the rotary wheel 117 becomes easy.

It should be noted that the wave plate 26 is separately disposed from the rotary wheel 117 in the present embodiment, but instead of this configuration, it is also possible to adopt a configuration in which a material having birefringence is used for the plate body 119 constituting the rotary wheel 117 to thereby make the rotary wheel 117 also function as the wave plate.

It should be noted that the scope of the invention is not limited to the embodiments described above, but a variety of modifications can be provided thereto within the scope or the spirit of the invention.

For example, in the embodiments described above, there is illustrated the configuration in which the blue light beams as the S-polarized light are emitted from the semiconductor lasers, and reflected by the polarization separation element, and then guided to the diffusion optical system and the wavelength conversion element. Instead of this configuration, it is also possible to adopt a configuration in which blue light beams as the P-polarized light are emitted from the semiconductor lasers, and transmitted through the polarization separation element, and then guided to the diffusion optical system and the wavelength conversion element, and the blue light beams diffused twice in the diffusion optical system and the yellow fluorescence are reflected by the polarization separation element, and emitted in the same direction to be used as the illumination light. In this case, unlike the embodiments described above, there is adopted a configuration in which the light source section, the diffusion optical system, and the wavelength conversion element are arranged on the same optical axis.

Further, it is also possible to adopt a configuration in which, for example, areas different in reflectance of the blue light beam from each other are disposed in the optical element provided with the diffusion section and the light separation section, and the ratio between the blue light beams reflected by the light separation section and the blue light beams transmitted through the light separation section can be controlled by changing the irradiation position with the blue light beams. Thus, the white balance of the illumination light can be controlled.

Although the light source device provided with the drive section for driving the optical element is illustrated in the second embodiment, it is also possible to adopt the configuration provided with the drive section in the light source device according to any one of the other embodiments.

Besides the above, the numbers, the shapes, the materials, the arrangement, and so on of the constituents constituting the wavelength conversion element and the light source device can arbitrarily be modified. Further, there is cited the example of the stationary type wavelength conversion element in the embodiments described above, but instead of this configuration, it is also possible to use a rotary type wavelength conversion element provided with a rotary wheel having a phosphor layer formed in a circular pattern.

Further, although in the embodiments described above, there is illustrated the projector provided with the three light modulation devices, the invention can also be applied to a projector for displaying a color image using a single light modulation device. Further, the light modulation device is not limited to the liquid crystal panel described above, but a digital mirror device, for example, can also be used.

Besides the above, the shapes, the numbers, the arrangement, the materials, and so on of the constituents of the projector are not limited to those of the embodiments described above, but can arbitrarily be modified.

Further, although in the embodiments described above, there is described the example of installing the light source device according to the invention in the projector, the invention is not limited to this example. The light source device according to the invention can also be applied to lighting equipment, a headlight of a vehicle, and so on.

The entire disclosure of Japanese Patent Application No. 2017-151346, filed on Aug. 4, 2017 is expressly incorporated by reference herein.

What is claimed is:

1. A light source device comprising:
a light emitting element adapted to emit light having a first polarization direction and a first wavelength;

a polarization separation element adapted to transmit either one of the light having the first polarization direction and the first wavelength and light having a second polarization direction perpendicular to the first polarization direction and the first wavelength, and reflect the other, and transmit or reflect light having a second wavelength different from the first wavelength to emit the light having the second wavelength toward a same direction as a direction in which the light having the second polarization direction and the first wavelength is emitted;

a wavelength conversion element adapted to convert the light having the first wavelength into the light having the second wavelength; and a diffusion optical system disposed separately from the wavelength conversion element and on a light path between the polarization separation element and the wavelength conversion element, the diffusion optical system including:

an optical element formed of a wave plate and including a plate body having a first surface located on a side of the polarization separation element and a second surface located on a side of the wavelength conversion element;

a diffusion section disposed on the first surface of the plate body and adapted to diffuse the light having the first wavelength when the light having the first wavelength passes; and a light separation section formed of a dichroic mirror disposed on the second surface of the plate body and adapted to reflect a part of the light having the first wavelength toward the diffusion section, transmit another part of the light having the first wavelength toward the wavelength conversion element, and transmit the light having the second wavelength.

2. The light source device according to claim 1, wherein the diffusion optical system includes a light collection optical system including at least one light collection optical element, and adapted to converge the light having the first wavelength toward the wavelength conversion element, and the diffusion section is disposed on a light path of the light having the first wavelength converged by the light collection optical system.

3. The light source device according to claim 2, wherein the diffusion section is disposed at a position where an intermediate image of the light emitting element is formed.

4. A projector comprising:
the light source device according to claim 3;
a light modulation device adapted to modulate light from the light source device in accordance with image information to thereby form image light; and
a projection optical system adapted to project the image light.

5. A projector comprising:
the light source device according to claim 2;
a light modulation device adapted to modulate light from the light source device in accordance with image information to thereby form image light; and
a projection optical system adapted to project the image light.

6. The light source device according to claim 1, wherein the diffusion section is disposed in an area crossing an optical axis of the light having the first wavelength.

7. A projector comprising:
the light source device according to claim 6;
a light modulation device adapted to modulate light from the light source device in accordance with image information to thereby form image light; and
a projection optical system adapted to project the image light.

8. A projector comprising:
the light source device according to claim 1;
a light modulation device adapted to modulate light from the light source device in accordance with image information to thereby form image light; and
a projection optical system adapted to project the image light.

9. A light source device comprising:
a light emitting element adapted to emit light having a first polarization direction and a first wavelength;
a polarization separation element adapted to transmit either one of the light having the first polarization direction and the first wavelength and light having a second polarization direction perpendicular to the first polarization direction and the first wavelength, and reflect the other, and transmit or reflect light having a second wavelength different from the first wavelength to emit the light having the second wavelength toward a same direction as a direction in which the light having the second polarization direction and the first wavelength is emitted;
a wavelength conversion element adapted to convert the light having the first wavelength into the light having the second wavelength; and
a diffusion optical system disposed on a light path between the polarization separation element and the wavelength conversion element, the diffusion optical system including:
a diffusion section adapted to diffuse the light having the first wavelength when the light having the first wavelength passes;
a light separation section formed of a dichroic mirror and adapted to reflect a part of the light having the first wavelength toward the diffusion section, transmit another part of the light having the first wavelength toward the wavelength conversion element, and transmit the light having the second wavelength; and
a light collection optical system adapted to converge the light having the first wavelength toward the wavelength conversion element, the light collection optical system including:
a first light collection optical element disposed on a side of the polarization separation element; and
a second light collection optical element disposed on a side of the wavelength conversion element,
wherein the diffusion section is disposed on a light path of the light having the first wavelength converged by the light collection optical system, the diffusion section is provided in the first light collection optical element, and the light separation section is provided in the second light collection optical element.

10. A projector comprising:
the light source device according to claim 9;
a light modulation device adapted to modulate light from the light source device in accordance with image information to thereby form image light; and
a projection optical system adapted to project the image light.

11. A light source device comprising:
a light emitting element adapted to emit light having a first polarization direction and a first wavelength;
a polarization separation element adapted to transmit either one of the light having the first polarization direction and the first wavelength and light having a second polarization direction perpendicular to the first polarization direction and the first wavelength, and reflect the other, and transmit or reflect light having a second wavelength different from the first wavelength to emit the light having the second wavelength toward a same direction as a direction in which the light having the second polarization direction and the first wavelength is emitted;
a wavelength conversion element adapted to convert the light having the first wavelength into the light having the second wavelength; and
a diffusion optical system disposed on a light path between the polarization separation element and the wavelength conversion element, the diffusion optical system including:
  a diffusion section adapted to diffuse the light having the first wavelength when the light having the first wavelength passes;
  a light separation section formed of a dichroic mirror and adapted to reflect a part of the light having the first wavelength toward the diffusion section, transmit another part of the light having the first wavelength toward the wavelength conversion element, and transmit the light having the second wavelength; and
  a light collection optical system adapted to converge the light having the first wavelength toward the wavelength conversion element, the light collection optical system including:
    a first light collection optical element disposed on a side of the polarization separation element; and
    a second light collection optical element formed of a plano-convex lens disposed on a side of the wavelength conversion element,
wherein the diffusion section is disposed on a light path of the light having the first wavelength converged by the light collection optical system, the diffusion section is provided on a convex surface of the second light collection optical element, and the light separation section is disposed on a flat surface of the second light collection optical element.

12. A projector comprising:
the light source device according to claim 11;
a light modulation device adapted to modulate light from the light source device in accordance with image information to thereby form image light; and
a projection optical system adapted to project the image light.

13. A light source device comprising:
a light emitting element adapted to emit light having a first polarization direction and a first wavelength;
a polarization separation element adapted to transmit either one of the light having the first polarization direction and the first wavelength and light having a second polarization direction perpendicular to the first polarization direction and the first wavelength, and reflect the other, and transmit or reflect light having a second wavelength different from the first wavelength to emit the light having the second wavelength toward a same direction as a direction in which the light having the second polarization direction and the first wavelength is emitted;
a wavelength conversion element adapted to convert the light having the first wavelength into the light having the second wavelength; and
a diffusion optical system disposed on a light path between the polarization separation element and the wavelength conversion element, the diffusion optical system including:
  a rotary wheel including:
    a plate body having a first surface located on a side of the polarization separation element and a second surface located on a side of the wavelength conversion element; and
    at least one first area and at least one second area disposed in the rotary wheel so as to be arranged in a rotational direction of the rotary wheel, the second area transmitting the light having the first wavelength and the light having the second wavelength;
  a drive source adapted to rotate the rotary wheel;
  a diffusion section disposed in the first area on the first surface and adapted to diffuse the light having the first wavelength when the light having the first wavelength passes;
  a mirror disposed on the second surface and adapted to reflect at least a part of the light having the first wavelength toward the diffusion section; and
  a light separation section adapted to reflect a part of the light having the first wavelength toward the diffusion section, transmit another part of the light having the first wavelength, and transmit the light having the second wavelength.

14. A projector comprising:
the light source device according to claim 13;
a light modulation device adapted to modulate light from the light source device in accordance with image information to thereby form image light; and
a projection optical system adapted to project the image light.

* * * * *